United States Patent [19]
Johnson

[11] Patent Number: 5,103,401
[45] Date of Patent: Apr. 7, 1992

[54] SYSTEM FOR PRECISELY CONTROLLING DISCHARGE RATES OF LOSS-IN-WEIGHT FEEDER SYSTEMS

[75] Inventor: Norman R. Johnson, Lynn Haven, Fla.

[73] Assignee: Merrick Industries, Inc., Lynn Haven, Fla.

[21] Appl. No.: 439,985

[22] Filed: Nov. 21, 1989

[51] Int. Cl.$^5$ .................. G01G 11/08; G01G 13/16; G06F 15/20

[52] U.S. Cl. ................................. 364/479; 177/105; 222/56; 222/58

[58] Field of Search ................... 177/50, 105; 222/56, 222/58, 77; 364/479, 567, 571.04, 571.08

[56] References Cited
U.S. PATENT DOCUMENTS

| | | | |
|---|---|---|---|
| 4,164,260 | 8/1979 | Blodgett | 177/50 X |
| 4,301,510 | 11/1981 | Ricciardi et al. | 364/567 |
| 4,754,822 | 7/1988 | Altenpohl et al. | 177/145 |
| 4,882,784 | 11/1989 | Tump | 364/567 |

*Primary Examiner*—Parshotam S. Lall
*Assistant Examiner*—Edward R. Cosimano
*Attorney, Agent, or Firm*—Pollock, Vande Sande & Priddy

[57] ABSTRACT

System for controlling the discharge rate of a material feeder. A weight scale connected to the material is sampled and the samples input to a digital processor. The digital processor determines for consecutive time intervals during discharge of said material, a weight loss over the time interval. The weight loss for the interval is compared with a desired weight loss which is calculated from a desired setpoint material discharge rate. The resulting error is averaged with subsequent errors to form a control signal for the material feeder. The calculation of errors over each subsequent interval increases the resolution of the control signal, increasing the ability to control discharge rates to compensate for changes in material density which otherwise affect discharge rates.

10 Claims, 6 Drawing Sheets

SYSTEM FOR PRECISELY CONTROLLING DISCHARGE RATES OF LOSS-IN-WEIGHT FEEDER SYSTEMS

The present invention relates to gravimetric weight loss feeding apparatus for controlling the discharge of dry materials. Specifically, the present invention comprises a control system which controls the material discharge rate to compensate for changes in material density.

Loss in weight feeder systems are in general use in industrial processes requiring precise metering of dry materials which are difficult to precisely meter. These systems control material discharge by weighing the volume of material being discharged and comparing the weight against a set point weight which decreases over time. The resulting error from setpoint weight is utilized as a feedback signal to increase or decrease the discharge rate of materials.

Systems of this type are exemplified in U.S. Pat. Nos. 4,579,252, 4,301,510 and U.S. Pat. No. Reissue 27,115. These systems, known generally as "gravimetric" systems, control discharge rates with respect to a setpoint rate of discharge.

The difficulty in obtaining a higher degree of control over discharge rate results from the nature of the material. Many dry materials experience a change in density which will naturally result in a steep rate change in discharge rate. These changes in material consistency result in a change in discharge rate which is beyond the response capability of loss in weight control systems.

Other anomalies which detract from system performance include vibration of the weighing scale, which introduces a quantum of noise into the weight signal, as well as sensor drift. The noise places a limit on the resolution of the error signal which is derived from subtracting the actual measured weight and desired weight of a material feeder device. The resolution limited error signal will in turn limit the control which may be achieved over the material discharge rate.

SUMMARY OF THE INVENTION

It is a primary object of this invention to precisely regulate the discharge of solid material in a loss in weight feeder.

It is a more specific object of the invention to provide precise regulation of a loss in weight feeding system which is substantially immune from changes in material density.

These and other objects of the invention are provided by a computer controlled gravimetric feeder which can control the discharge of particulate materials to a high degree of accuracy with respect to a predicted loss in weight derived from a setpoint material discharge rate. The control within this precise tolerance is obtained in the face of material density changes which can result due to caking, or from excessive moisture content of the material.

In carrying out the invention, a weight sensor such as a counterbalanced parallelogram suspension scale is sampled at a periodic interval. The sampled values of weight are digitized and applied to a process computer.

The process computer receives an operator-supplied setpoint discharge rate to establish the gravimetric feeder discharge rate. The setpoint discharge rate is used to derive a predicted loss of weight for a sub-interval of the total discharge time. The system controls discharge based on the predicted weight loss for each sub-interval, and only indirectly with respect to the setpoint discharge rate. The process computer derives a control signal for the gravimetric feeder based on an error which is measured between an actual weight loss and predicted weight loss for the setpoint discharge rate.

The error signal for controlling the discharge rate of the loss in weight feeder has increased resolution over those systems which derive an error signal based on the difference between actual weight measurement and a desired weight during the course of the feeder discharge cycle.

The error signal derived by the invention represents the difference between a predicted weight loss and calculated weight loss which occurs over time intervals which are subintervals of the total discharge time. Thus, the system is continuously monitoring weight loss over each subinterval and computing a new error signal based on a predicted loss in weight which occurs during the subinterval.

In the preferred embodiment of the invention, an array of average weight values is being continuously updated, representing a new array of weight data for a subsequent time interval. The loss in weight for each newly formed array of average values is determined as the difference between the oldest average weight value in the array and the newest average value in the array.

The desired weight loss over the same interval of time (T1-T0), in which the oldest and newest average weight values are obtained, is computed from the setpoint discharge rate and the duration of time interval (T1-T0).

An array of error signals is formed, representing the value of each error which was calculated for each time interval. The array has a fixed number of error values which are continuously updated with each new error value as a replacement for the oldest error value. The average of the error array is taken as the control signal for a conventional proportional speed controller of the discharge device.

The device is proven capable of regulating discharge rates of 1 pound of material per hour to 10,000 pounds per hour.

DESCRIPTION OF THE PREFERRED EMBODIMENT

Figure 1:
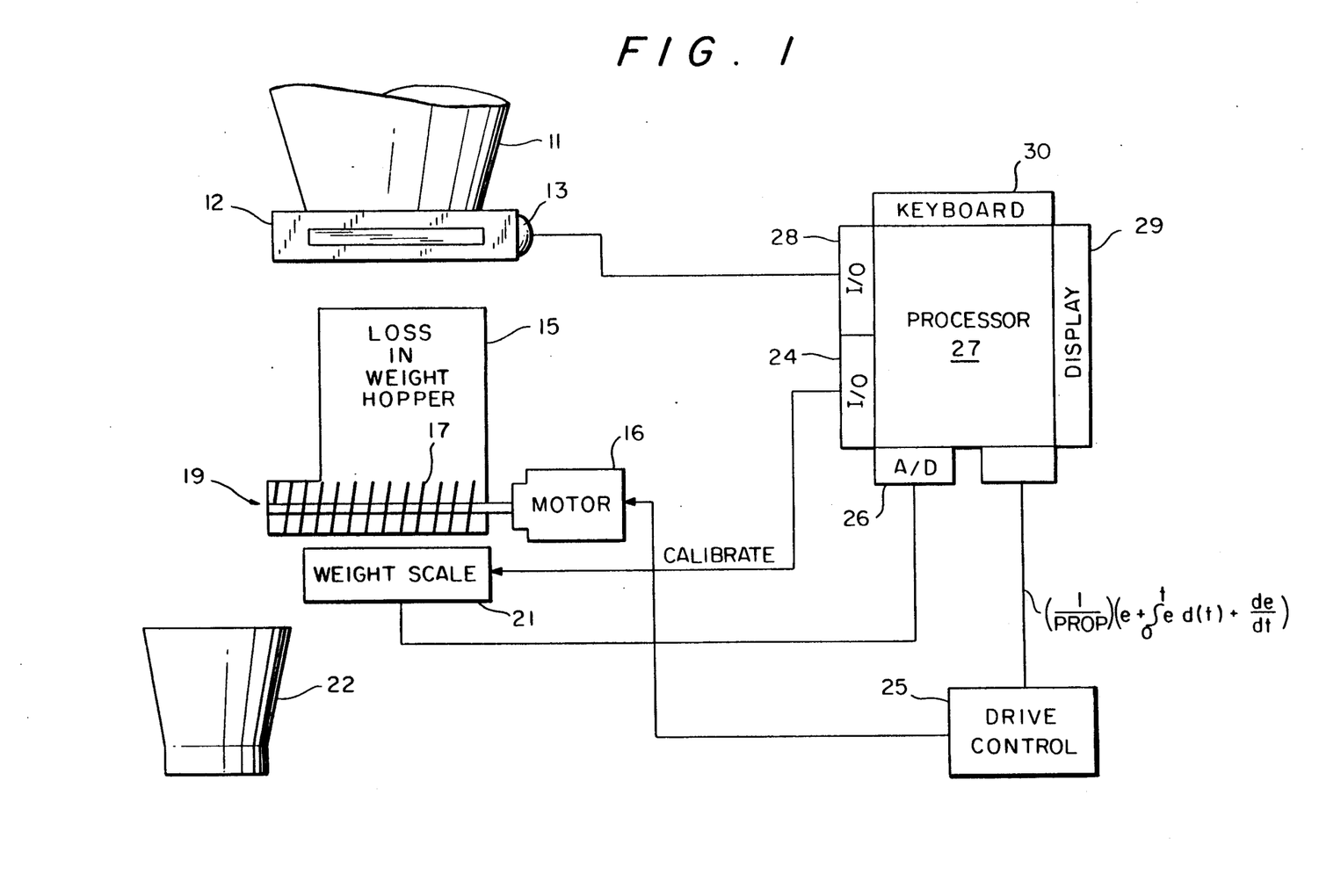
FIG. 1 is an illustration of a loss in weight feeder in accordance with a preferred embodiment of the invention.

Referring now to FIG. 1, there is shown a loss-in-weight feeder system in accordance with a preferred embodiment of the invention. The device shown in FIG. 1 includes a loss-in-weight hopper 15 which receives material to be dispensed from a storage bin 11. A control valve 12 is shown at the bottom of the storage bin 11 which can control the refill of the loss-in-weight hopper 15. The valve is operated from a solenoid 13 under control of processor 27.

The particular loss-in-weight hopper shown is of the type having a helix screw 17 connected to a motor 16. The outlet 19 of the loss-in-weight hopper discharges material at a rate proportional to the rotational speed of the helix screw 17. As is known in loss-in-weight feed systems, the discharge rate can be controlled at a predetermined rate for material of a given density by regulating the speed of motor 16.

A weight sensor 21 is shown which is a counterbalanced parallelogram suspension scale which permits the deadload, i.e., the weight of hopper 15 without any material, to be compensated with counterweights. This suspension scale has high immunity to the impact of lateral forces which may disturb the accurate measuring of the vertical component of the weight of material in the feed hopper 15. A discharge receptacle 22 is shown, positioned beneath the discharge opening 19 of the loss-in-weight hopper 15.

The suspension scale 21 is connected through analog-to-digital converter 26 to a processor 27. The suspension scale measurements are converted to a digital signal which is sampled at a periodic rate. The sampling rate is selected in the preferred embodiment to be at approximately 30 times per second. The processor 27 will scale the digital signals and permit display of the measured weight on an associated display 29 as a related task executed by the processor.

The processor 27 may be a conventional small computer system, having multiple ports, including a port for reading a keyboard 30 entry, a port connected to a display 29 for displaying the desired calculations such as measured weight, discharge setpoint values, and any particular running discharge rate error which the system may be measuring during control over the discharge rate from loss-in-weight hopper 15. A digital interface 28 is shown connected to one of the ports of processor 27 to control the solenoid 13, permitting refill of the loss-in-weight hopper 15 at intervals determined by the processor 27. A motor controller 25 is shown which proportionally controls the speed of motor 16 to set the discharge rate for the loss-in-weight hopper 15. The processor 27 can also command the scale 21 to enter a calibration mode through an additional I/0 port 24.

Figure 2:
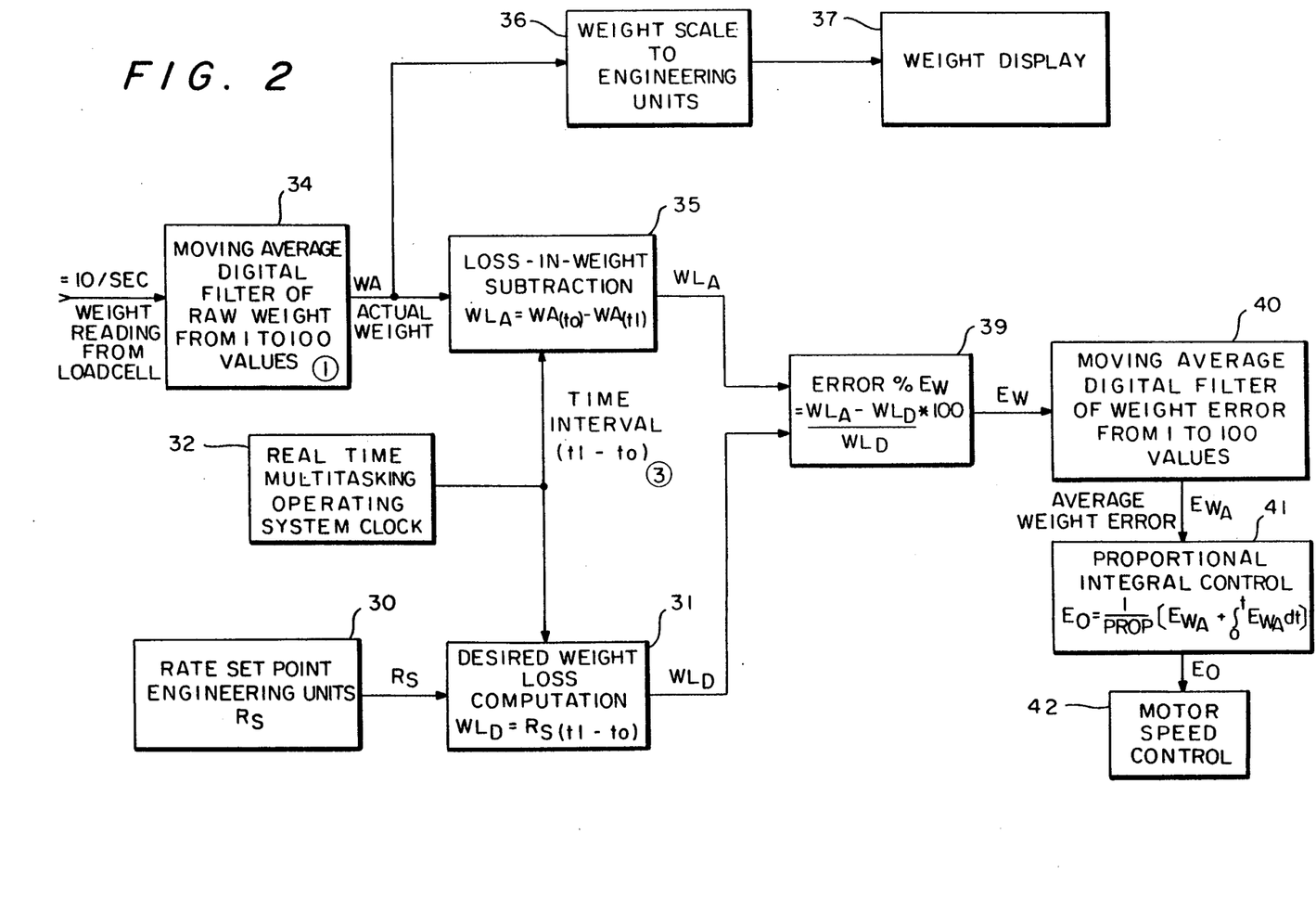
FIG. 2 illustrates the loss in weight control process executed by the processor of FIG. 1.

Improved resolution over control of the discharge rate from hopper 15 is accomplished by the control algorithm shown in FIG. 2. The control algorithm of FIG. 2 derives a control signal having increased resolution over conventional loss-in-weight systems. The process identified in FIG. 2, and which will be explained in greater detail, creates an error signal based upon a predicted weight loss over an interval which may be 200 milliseconds, and compares the predicted weight loss with a measured actual weight loss. These error signals are averaged for up to 100 values and applied to control the motor speed through a standard proportional integral controller 25.

Referring to FIG. 2, the derivation of this error signal for controlling motor speed and thus discharge rate for the loss-in-weight hopper 15 may be seen. A setpoint discharge rate for the loss-in-weight hopper 15 is input via the keyboard 30 shown in FIG. 1. The setpoint rate is preferably input as a desired percentage rate of discharge of the maximum system discharge rate. Based on this setpoint rate of discharge, a calculation of desired weight loss may be made over periodic intervals established by the multitasking system clock 32. The desired weight loss computation is shown in 31 as being the setpoint rate $R_S$ multiplied by the duration of the time interval T1-T0. The interval T1-T0 is the interval over which corresponding actual weight averages are stored in the array. The calculated desired weight loss computation WLD may be periodically compared with the actual weight loss experienced over the time interval T1-T0.

Readings from the suspension scale 21 are stored in an array in step 34 which may have a size established from 1 to 100 values. The array constitutes values of consecutive weight readings from the suspension scale 21. Recognizing that the invention may be implemented in systems requiring feed rates in the range of 1 to 10,000 pounds per hour, the size of the array may be advantageously selected by the operator through a keyboard 30. The processor 27 of FIG. 1 may, include a menu in its program, directing the operator to select the desired array size (i.e., number of values).

The consecutive measured values of weight which are received 30 times a second are stored as a matrix array in processor 27. The array of weight measurements is totalled and an average weight, WA, is obtained for the values stored in the array. The array is updated by replacing the oldest sample weight value with the most recent sample weight value. This averaging process provides an effective digital filtering of the suspension scale signal. A second array of average weights WA is formed which is also continuously updated by discarding the oldest average weight in favor of the newest average weight. The array size is a function of the desired metering accuracy. To control discharge rate to within $\frac{1}{4}\%$ of setpoint discharge rate, and array size of approximately 60 average weight values is needed.

In computing a loss in weight which occurs during each of the time intervals T1-T0, established by the system multitasking clock 32, the average weight values of the average weight array at intervals T0 and T1 are subtracted in process step 35. Thus, a loss in weight WLA between the interval T0-T1, which is typically 200 milliseconds, is obtained for comparison with the predicted loss in weight, WLD, from process step 31.

Having thus derived predicted and actual weight losses over the time interval T0-T1, it is possible to derive the actual error as shown in process step 39. The difference between these calculations can be expressed as a percent of error EW. EW is shown to be equal to $$\frac{WL_a - WL_d}{WL_d}.$$

The values of EW computed for each time interval in which a loss in weight is computed forms an array of error values having a size from 1 to 100 values, selected in accordance with the control requirements for the system. The array represents consecutive weight errors which, in process step 40, are averaged over the entire array to derive an error average of EWA, representing a digital filtered value of EW. The average weight error is used in a conventional proportional integral control system, as exemplified by process step 41 to control the motor speed 42. Each new error value replaces the oldest value so that the array represents the most current running average of new error values. The process illustrated in FIG. 2 provides for stability of the discharge rate control, as well as increased control resolution for instances where the material density changes, and otherwise provides step-wise change in discharge rate. By deriving an error from the predicted weight loss and measured weight loss, and averaging an array of errors, further resolution and control of the discharge rate for the feed hopper 15 is obtained.

The proportional controller 41 has a constant PROP selected in accordance with conventional control system criteria which may be anywhere from 3 to 30, depending on the application.

Also associated with the process of FIG. 2 is a weight display function 37. It is clear that using the processor 27 of FIG. 1, and the associated display 29, it is possible to scale each of the actual weight averages WA in step 36 during program execution to permit the operator to visualize the actual weight of the feed hopper 15 at all times.

Figure 3:
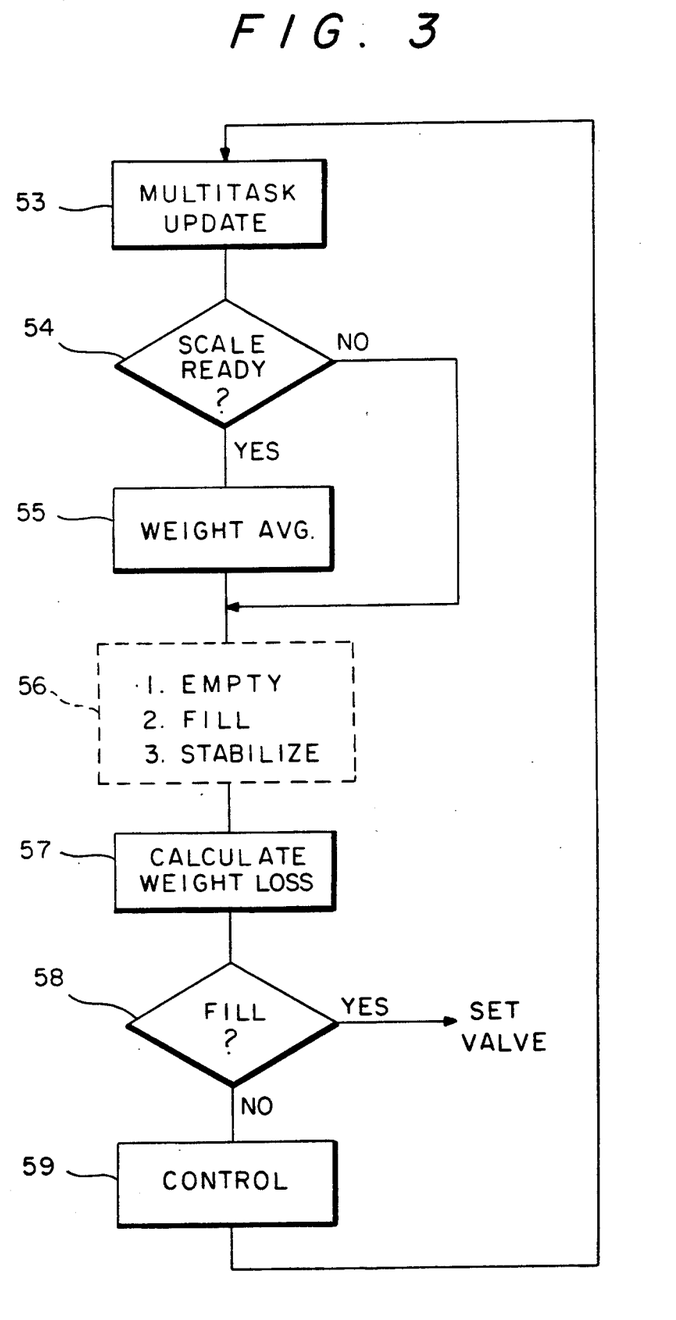
FIG. 3 illustrates the organization of the system program executed by the processor of FIG. 1.

The sequence of operation carried out by processor 27 is shown in FIG. 3. FIG. 3 is a general description of the major portion of program execution steps for processor 27 which are directly and tangentially involved in the execution of the process shown in FIG. 2.

The first major function shown in FIG. 3 is a multitask update 53. The multitask update 53 will condition the system for entering the discharge rate control function. The multitask update process 53 will update values for other tasks which must be executed by the processor 27. This would include the display task, wherein the display is updated with the most recent weight measurement, the keyboard task, for reading in new data, and/or other commands to the device, as well as controlling the valve 13 by updating its status. Additionally, all new data input to the system, such as a new setpoint, is updated. The state of the machine is updated depending on whether or not the operator has input any other conditions to be acted upon by the system, such as valve open/valve closed, clean out and other requests which may be executed by the processor 27, but which are generally unrelated to the discharge rate control function. Once these other subsidiary tasks have been performed, these other tasks are locked out while the program executes the control function for controlling the discharge rate from the feed hopper 15.

Following lockout of these other tasks, the weight data will be read in the multitask update function in step 53, deriving a new weight value for the array of weight values. Decision block 54 will determine whether or not the weight suspension scale is in a calibrate mode. The calibrate mode represented by NO is initiated by the processor 27 during the time the system is in a stabilization mode which directly follows filling of the loss in weight hopper 15. Assuming that the scale is not in the calibrate mode, indicated by YES, but ready to begin a discharge control function, the array of input weight values WA is updated and the weight average taken in step 55. This provides effective digital filtering of the measured weight value WA. This weight average is determined from the summation of all the weight values in the array occurring in the current multitask clock time interval, and dividing the result by the number of values in the array. A second array of average weight values is formed, each value of the second array representing the average weight for a corresponding multitask clock interval. The weight average array is a moving average with each new value of the weight average, replacing the oldest value in the array. These arrays include a pointer to point to the oldest value so that it may be discarded in favor of the newest reading or calculated average.

The block identified generally as 56 represents other system states controlled by the processor 27 and are not active in the control of the discharge rate. This block 56 will determine whether or not the system is in an EMPTY mode, wherein a controlled discharge rate is to be established in accordance with the invention, or whether the other modes for the system are selected, such as FILL, wherein the feed hopper 15 is loaded with material, or STABILIZE, wherein following a FILL stage, the weight scale is permitted time to stabilize from any shock and transient forces experienced during filling. The system will not enter the EMPTY mode until a minimum material weight is in the hopper. If the minimum material weight is not present, the system will activate solenoid valve 13 to fill the loss in weight hopper 15. Weight readings are continuously taken in the STABILIZE mode to ascertain that the hopper contains the required material weight. The system can then enter the EMPTY mode. When the system enters the EMPTY mode, wherein the discharge rate is to be metered, block 57 will calculate a weight loss from the array of weight averages obtained in step 55, for the period T0 through T1. This interval is the time interval over which the weight averages were taken. The contents of the weight average array are used to determine an actual loss in weight during the interval T1-T0. When the average weight has been determined to be below an operator supplied minimum weight, the system enters the FILL mode.

The program is shown as including a decision block 58 which will determine whether the average weight is below the minimum material wight and the system is to enter the FILL mode. If it is to enter the FILL mode, indicated by path YES, then the discharge rate is controlled at the last computed average error signal, and the weight loss hopper 15 receives additional material. The valve 13 is set as a result of this decision and the weight in loss hopper receives the additional material.

During the EMPTY mode indicated by path NO, in which the discharge rate is being accurately controlled, block 59 will compute the error in accordance with function 39 of FIG. 2, and complete the remaining control steps including obtaining the moving average for the error, and establishing a proportional control for the motor 16, as identified by functions 40 and 41 of FIG. 2.

The system shown generally in FIG. 3 will continue during the EMPTY mode to read in a new value of measured weight each multitask clock interval T, taking a new average in block 55, calculating the weight loss in block 57 and implementing the control function in block 59. The errors computed at each multitask clock interval are averaged and used as a variable in a proportional integral control system for controlling the motor speed 16 so a to accurately control the discharge rate from discharge opening 19 of the hopper.

A more detailed description of those subroutines identified as 55, 57 and 59 which control the rate of discharge during an EMPTY mode will now be described.

Figure 4:
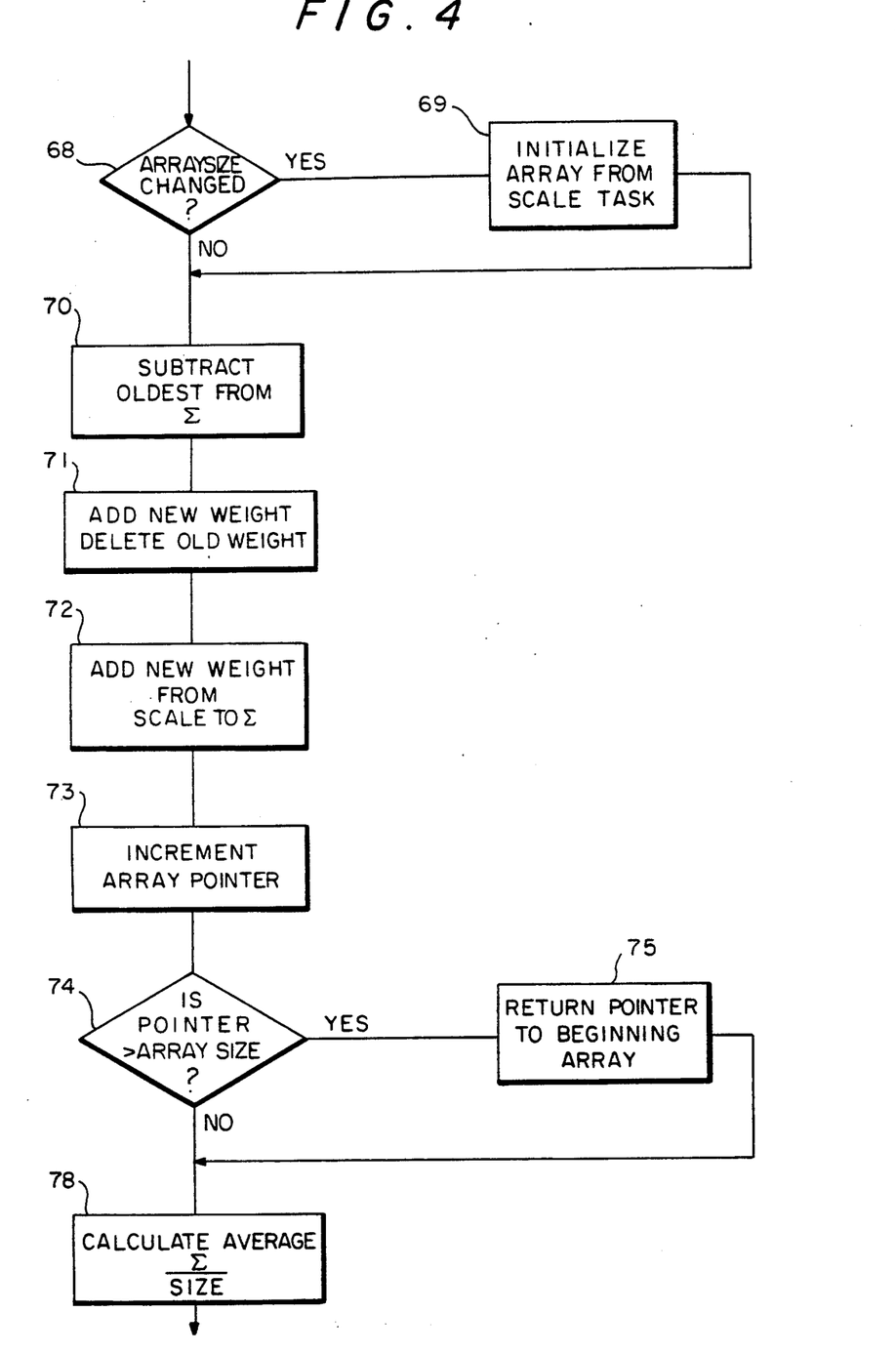
FIG. 4 illustrates the detailed program steps which are executed by the processor of FIG. 1 for forming an array of weight measurements.

Referring specifically to FIG. 4, the weight average function block 55 is shown as a series of execution steps beginning with decision block 68. Decision block 68 will determine whether or not the array size in which a plurality of weight measurements are to be stored has been changed through a keyboard entry. Assuming that the operator has selected a given array size which is identified for a particular application, step 69 will initialize the array with a weight value from the most recent measurement of the scale following a stabilization mode, representing the time subsequent to filling the loss weight hopper, and just prior to beginning to empty the hopper.

Once the array has been initialized, each subsequent pass through the loop under control of the multitask clock, will result in the oldest value of the array being discarded in step 70. The newest value of weight measurement will be inserted in its place in step 71. Step 72 maintains a running average of all the weight measurements in the array, including the most recent and oldest value. An array pointer is used to maintain track of the oldest value in the array such that each subsequent pass through the subroutine will identify the oldest point and permit its replacement with the newest measured weight value. Once the array pointer has gone completely through the array, as determined in decision block 74, step 75 will reset it to point to the beginning of the array. Each pass through decision block 74 will result in a new average weight being determined in step 78. This average weight is computed by summing all the array data points and dividing by the number of those data points which constitute the array size.

Thus, it is seen that during each multitask time interval of the EMPTY mode, the array is updated and averaged to provide a weight average.

Figure 5:
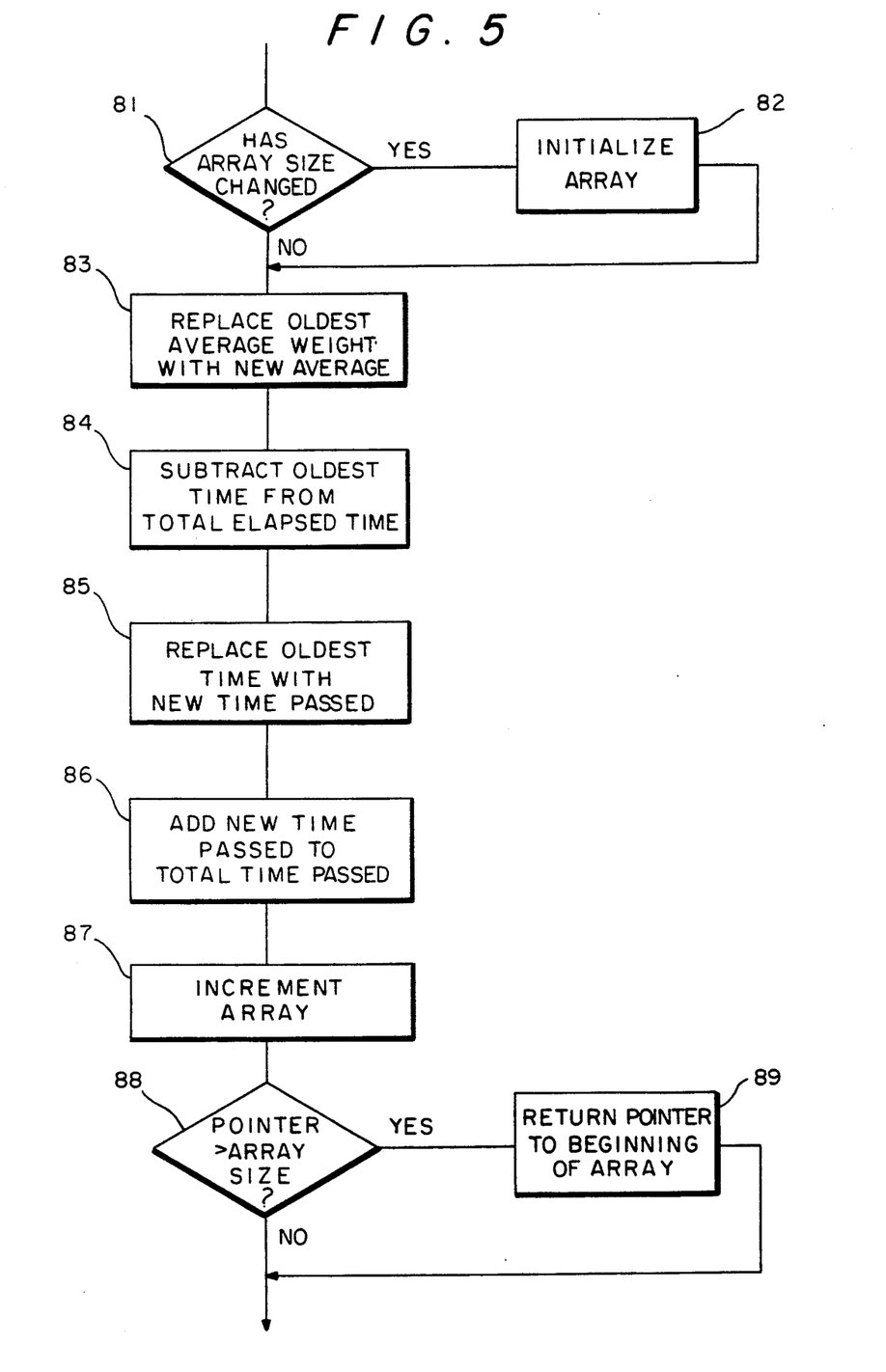
FIG. 5 illustrates the detailed program steps for forming an array of average weight values and the time interval representing this array.

FIG. 5 illustrates how the actual weight loss for the average weight array is determined in subroutine 57. A second array is formed comprising a plurality of average weights obtained from step 78 of the subroutine of FIG. 4. This array has a size which may also be operator-selected in accordance with the discharge rate for which the system may be configured. A decision block 81 determines whether or not an operator has entered by keyboard an array size for the average weight array. The NO path is taken if no changes have been made to the array size. In the event such an array size has been changed by keyboard entry, indicated by the YES path, the array is initialized with average weight and time values representing the most recent average weight obtained in subroutine 55. The oldest average weight value in this array is replaced in step 83 every multitask time interval with a new moving average weight obtained from step 78 of the weight averaging subroutine of FIG. 4. At the same time, an array is kept, the values in the array being the increments of time between each of the averaged weight values obtained from step 78.

This real time array is additional to the array of average weight values. The time array is updated, just as the average weight is in the average weight array, each time a new average weight is inserted in the array. The time array values represent the time increment between consecutive weight averages obtained from step 78, and stored in the average weight array.

This tine array is maintained so that the sum of all values in the time array is equivalent to the total elapsed time interval over which weight averages in the average weight array have been obtained. In step 84, the total elapsed time is computed by summing all the time data values represented in the array, and the oldest elapsed time is subtracted from the total in step 84. The oldest elapsed time in the array is then replaced in step 85 with the newest increment of time, representing the time at which the newest weight average was taken for its corresponding array. The new time increment is added to the total time passed in step 86. This will then represent the time interval T1-T0 between the oldest and newest average weight values. As with the other arrays, a pointer is used to point to the oldest values of the array in step 87, so that the oldest average weight value and its corresponding time increment is continuously identified. As soon as the pointer points to the end of the array as determined in decision block 88, the pointer is set to the beginning of the array in step 89, corresponding to the next location for inserting the newest value of time increment and corresponding average weight for the respective arrays.

Figure 6:
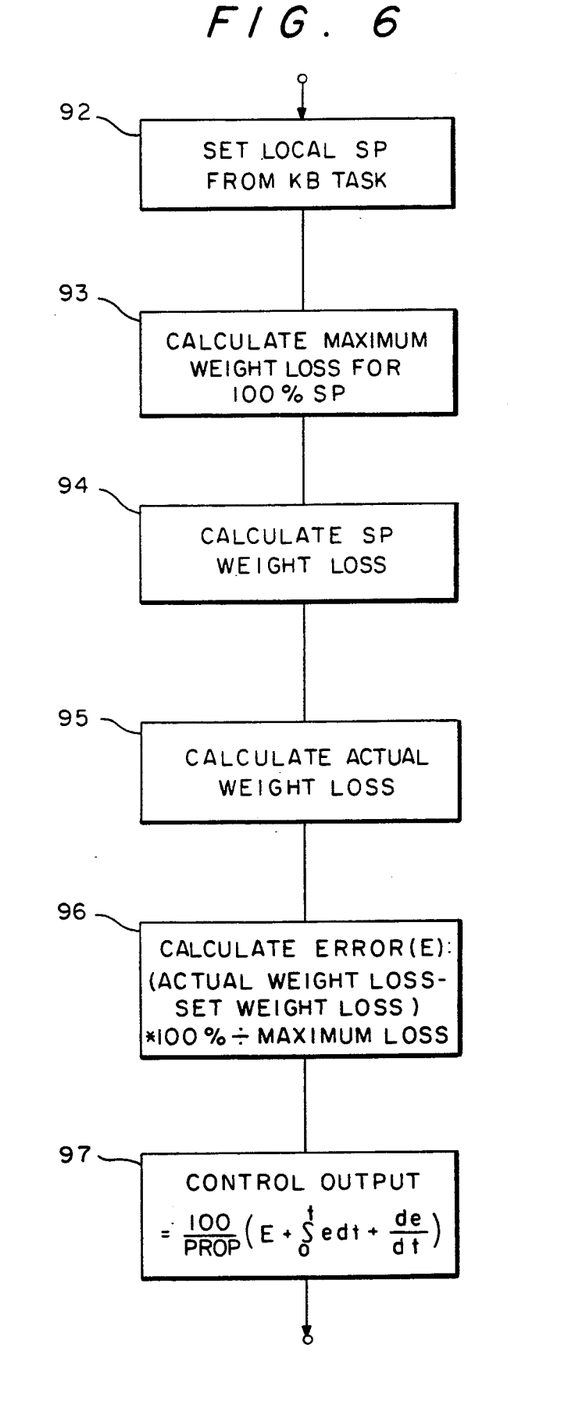
FIG. 6 illustrates the detailed program steps for calculating the error between a predicted setpoint weight loss and actual weight loss for the time interval representing the array of weight values.

In FIG. 6, there is described the subroutine which permits calculation of a weight loss setpoint for the time interval T1-T0, and which will calculate the actual weight lost over the time interval T1-T0. A setpoint is derived in step 92 from the keyboard task, wherein the operator-supplied setpoint is scanned from the keyboard. The scanned setpoint is the desired discharge rate as a function of system capacity. Thus, discharge rates are configured as a percentage of the maximum discharge rate permissible through the feed hopper 15.

Associated with the setpoint rate is a calculated maximum weight loss for 100 percent setpoint over the time period T1-T0 determined in step 93. The setpoint weight loss for the time interval T1-T0 is calculated in step 94. Thus, the inputted setpoint rate which is a fraction of the maximum discharge rate for the feed hopper 15 is used to calculate a desired weight loss over the total time elapsed between the oldest and newest weight average, as determined in step 86 of FIG. 5.

Given the desired weight loss for the total time passed, the actual weight loss can be computed in step 95, and then compared to the calculated setpoint weight loss. This actual weight loss is determined by taking the oldest average weight in the array and subtracting from it the newest average weight for this array. The error represented by the deviation between the actual weight loss and the setpoint weight loss is normalized to a 100 percent setpoint rate by multiplying by 100 and dividing by the maximum weight loss for a 100 percent setpoint rate in step 96. This calculated error is expressed as $$\frac{(WLA - WLD) \times 100}{WL_{max}}$$

This error deviation can be summed in an array of error deviations to find a moving average error. This moving average is formed by summing all the error deviations calculated for an array size which is selected by the operator along with the other array sizes, and averaged as was the average weight array, by dividing the sum by the total number of points in the array. This represents a digital filtering of the derived error deviations.

With the averaged error, input signals are provided to the proportional controller 25 for establishing the rotational speed of motor 16. The proportional control is as shown in 97 proportional to the sum of the average error E, the integral of the average error E and the derivative of the average error E as is known in conventional control system techniques. Thus, an effective control over the discharge rate is effected, based on an average error which error is determined as a proportion of an actual weight loss and setpoint weight loss. There has herein been described, in a preferred embodiment, an example of the invention described more particularly by the claims which follow.

What is claimed is:

1. A system for controlling the amount of material discharged from a feeder comprising:
 a weight scale for measuring the weight of a supply of material being discharged from a feeder;
 a digital processor for periodically sampling a signal from said weight scale, and digitizing said signal;
 digital filter means for filtering said digitized signal, and providing an array of continuously updated average weight values, including an oldest and newest average weight values which are a moving average of said digitized signal;
 means for providing a desired digital weight loss signal over the time interval represented by average weight values of said array;
 means for providing a loss in weight signal based upon said array of average weight loss values;
 means for deriving an error signal based upon said loss in weight signal and said desired weight loss signal;
 second digital filter means for providing an average of a plurality of said error signals; and,
 means for providing a proportional integral control signal in response to said error signal for controlling the discharge rate from said feeder.

2. The system for controlling the amount of material discharged from a feeder according to claim 1 wherein said first digital filter means provides said oldest and newest weight averages to said means for providing a loss in weight signal which computes said loss in weight signal as a function of said oldest and newest weight averages.

3. The system of claim 1 wherein said error signal is derived from an array of error signals comprising consecutive measured error signals having an oldest error value and a newest error value, each error value being proportional to the difference between said oldest value of average weight, the newest value of average weight and said desired weight loss.

4. The system of claim 3 wherein said error signal comprises a running average of said array of error values.

5. A system for controlling the amount of material discharged from a feeder having a selectable mass discharge rate comprising:
 a weight scale means for measuring the weight of said feeder and supplying at periodic intervals a digital weight value;
 a digital filter providing an array of such digital weight values, and providing an average weight value for said array;
 means for providing a reference rate of mass discharge for said feeder;
 loss in weight determining means for providing from a plurality of consecutive average weight values a plurality of loss of weight values;
 error determination means for determining from each consecutive loss of weight values and said reference rate of mass discharge an array of error values, and an average error value from said array of error values; and,
 proportional control means for supplying a control signal to said feeder for controlling said feeder discharge rate in a direction to reduce said average error value.

6. A system for controlling the amount of material discharged from a feeder according to claim 5 wherein said reference means comprises means for generating a weight loss from said desired mass discharge rate.

7. A system for controlling the amount of material discharged from a material feeder having a controllable discharge rate comprising:
 a weight scale means measuring the weight of said material feeder, and providing a digital signal representing the weight of said feeder;
 a digital processor connected to receive said digital signal, and connected to receive as an input a desired discharge rate for said feeder, said digital processor being programmed to execute the steps of:
 determining a predicted loss in weight over a plurality of consecutive time intervals at said desired discharge rate;
 comparing at each time interval the predicted loss in weight and the actual loss in weight of said material feeder;
 deriving an error between said predicted loss in weight and said actual loss in weight for each of said consecutive intervals; and,
 deriving a control signal from said error signal for controlling said feeder discharge rate.

8. The system for controlling the amount of material discharged from a material feeder having a controllable discharge rate according to claim 7 comprising means for accumulating a plurality of said loss in weight errors, and averaging said plurality of errors over a plurality of said intervals.

9. The system according to claim 7 wherein said digital processor accumulates a plurality of actual loss in weight measurements and produces an average of said actual loss in weight measurements.

10. The system according to claim said processor updates said plurality of loss in weight measurements by discarding the oldest measurement each consecutive interval and adding a new loss of weight measurement.

* * * * *